(12) United States Patent
Klassen et al.

(10) Patent No.: US 7,173,734 B2
(45) Date of Patent: Feb. 6, 2007

(54) INTERCOLOR BLEED REDUCTION IN LIQUID INK PRINTERS

(75) Inventors: R. Victor Klassen, Webster, NY (US); David A. Mantell, Rochester, NY (US)

(73) Assignee: Xerox Corporation, Stamford, CT (US)

(*) Notice: Subject to any disclaimer, the term of this patent is extended or adjusted under 35 U.S.C. 154(b) by 782 days.

(21) Appl. No.: 10/317,233

(22) Filed: Dec. 11, 2002

(65) Prior Publication Data

US 2004/0114158 A1    Jun. 17, 2004

(51) Int. Cl.
  *G06F 15/00* (2006.01)
  *G06K 1/00* (2006.01)
  *H04N 1/60* (2006.01)

(52) U.S. Cl. .............. 358/1.9; 358/3.24; 358/3.26; 358/518; 358/540; 358/532; 358/530; 358/504; 382/162; 382/167; 382/199; 382/256; 382/257; 382/266; 382/269; 382/275; 347/14; 347/19; 347/43

(58) Field of Classification Search ............. None
See application file for complete search history.

(56) References Cited

U.S. PATENT DOCUMENTS

| | | | |
|---|---|---|---|
| 4,930,018 A | 5/1990 | Chan et al. | 358/298 |
| 5,515,479 A | 5/1996 | Klassen | 395/109 |
| 5,519,815 A | 5/1996 | Klassen | 395/109 |
| 5,563,985 A | 10/1996 | Klassen et al. | 395/109 |
| 5,635,967 A * | 6/1997 | Klassen | 347/43 |
| 5,649,071 A | 7/1997 | Klassen et al. | 395/109 |
| 6,081,340 A | 6/2000 | Klassen | 358/1.1 |
| 6,161,919 A | 12/2000 | Klassen | 347/43 |
| 6,183,062 B1 | 2/2001 | Curtis et al. | 347/41 |
| 6,270,186 B1 | 8/2001 | Smith et al. | 347/41 |
| 6,290,330 B1 * | 9/2001 | Torpey et al. | 347/43 |
| 6,361,144 B1 | 3/2002 | Torpey et al. | 347/43 |
| 6,445,463 B1 | 9/2002 | Klassen | 358/1.9 |

* cited by examiner

*Primary Examiner*—King Y. Poon
*Assistant Examiner*—Benjamin Dulaney

(57) ABSTRACT

A system and method for detecting edge locations where intercolor bleeding would likely be a problem, and reducing the amount of ink printed at those locations. The method operates on image data including a set of pixels with each pixel having multiple separation values. Upon receipt of the image data, the data is analyzed to identify those pixels located at an edge. A coverage value is computed from the separation values for those pixels identified as being located at an edge. Based on the coverage value, a reduction factor is determined. The reduction factor is used to multiply the separation values for the pixels located at the edge to yield reduced pixel values.

9 Claims, 4 Drawing Sheets

INTERCOLOR BLEED REDUCTION IN LIQUID INK PRINTERS

FIELD OF THE INVENTION

The present invention relates to the art of image processing. In particular, the embodiments disclosed herein find particular application in reducing intercolor bleeding in liquid ink printing, and will be described with particular reference thereto. In addition, the teachings herein find application in conjunction with the use of CMY offset in ink drop printing.

BACKGROUND AND SUMMARY

Liquid ink printers of the type often referred to as drop-on-demand, such as piezoelectric, acoustic, phase change wax-based or thermal, employ at least one printhead from which droplets of ink are directed towards a recording sheet. Within the printhead, the ink is contained in a plurality of channels. Power pulses cause the droplets of ink to be expelled as required from orifices or nozzles at the end of the channels.

Liquid ink printers, including ink jet printers, deposit black and/or colored liquid inks which tend to spread when the ink is deposited on paper as a drop, spot, or dot. A problem of liquid ink printers is that the liquid inks used have a finite drying time, which tends to be somewhat longer than desired. Bleeding tends to occur when the drops are placed next to each other in a consecutive order or in a cluster of dots within a short time. Bleeding, spreading, and feathering causes print quality degradation including color shift, reduction in edge sharpness and solid area mottle which includes density variations in the areas due to puddling of inks.

Intercolor bleeding is a well-known problem that occurs when ink from one color area bleeds into or blends with ink from another color area. In particular, when an abrupt change in one or more separations occurs, with ink of different colors on each side of the interface or edge, the dye may diffuse across the edge, generally following paper fibers, and resulting in a ragged, at best, or badly blurred, at worst, edge. Intercolor bleeding is pronounced where an area of black ink (relatively slow drying) adjoins an area of color ink (relatively fast drying); however, intercolor bleeding can occur at the interface between areas of any color inks that dry slowly enough to mix before drying.

Various methods have been proposed to increase edge sharpness and to reduce intercolor bleeding. At least three general approaches have been used to provide acceptable image quality in the past: (1) employing surface coatings to absorb or polymerize the ink, preventing lateral diffusion; (2) limiting maximum drop count, either globally through color conversion tables or locally through image processing; and (3) tailoring ink formulations. The latter category includes so-called fast-dry inks, which penetrate the paper rapidly, giving a relatively "dry" surface when the next separation is printed, and Hewlett-Packard's specially formulated carbon black ink which precipitates out of solution immediately on contact with any of the colored inks with which it is used. While all of the proposed methods reduce intercolor bleeding to some degree, they all have one or more drawbacks that affect printer performance and/or image quality.

In the office market specific paper requirements are unacceptable, particularly for everyday use. Additionally, ink design involves many tradeoffs which don't always allow one to optimize productivity, optical density and bleed simultaneously. For example, using a fast dry ink in place of a slow drying black ink often results in a reduced quality of black reproduction as most fast drying black inks generally available have lower image quality than slow drying black inks. Additionally, fast drying black inks typically result in fuzzy edges in black areas next to non-printed areas. Using fast drying black ink at an interface and slow drying black ink for interior regions can eliminate lower image quality associated with fast drying black inks, but increases the cost and complexity of printer design by requiring a fifth ink in addition to the cyan, magenta, yellow and slow drying black ink.

For the photo-finishing market coated papers are standard. Nonetheless, ink reduction at edges can be an important component of a system strategy to limit coating thickness (cost) or color-color registration requirements (latitude). Multiple-drop per pixel printing sometimes needs a large number of drops to provide maximum optical density (for black) and saturation (for colors). At the same time, such large numbers of drops virtually ensure bleed at color/color edges on plain paper and even on some coated media. The problem, then, is to ensure that at edges the number of drops is reduced, while elsewhere it remains as specified by the color conversion and error diffusion or halftoning processes.

Prior solutions in similar situations appear in U.S. Pat. No. 4,930,018 (to Chan) and U.S. Pat. No. 5,635,967 (to Klassen). The former applies to multiple drop per pixel, but uses reduced resolution and limits the drop count throughout the image through a modified error diffusion. It accepts as input a continuous tone image and generates a drop count for each of several dye loadings at each pixel. The latter, on the other hand, accepts a single drop per separation per pixel image, reducing average drop count at edges. Additionally, in a series of closely related U.S. patents including U.S. Pat. Nos. 6,361,144 and 6,290,330 (to Torpey); U.S. Pat. No. 6,270,186 (to Smith); and U.S. Pat. No. 6,183,062 (to Curtis) there is taught the reduction of intercolor bleeding at the interface between regions as well as the reduction of bleeding at edges of printed/non-printed regions by modifying the pixels within a border region along the edge or interface to reduce the amount of ink deposited within the border region.

To address the problem of intercolor bleeding, there is taught herein a method of reducing intercolor bleeding by finding edges in an image and reducing the number of drops printed at those edges that would otherwise be prone to (likely to experience) intercolor bleeding. In accordance with the teachings herein, there is also disclosed a method employing small look-up tables to find edges within separations and to determine an amount to reduce ink on both sides of the edge, e.g., determine reduction of ink, or determine maximum amount of ink to be deposited at a given edge. The table based edge finding eliminates the need for special image processing or digital front end (DFE)-based tags. An additional benefit arises in that the method may be employed to generate a signal that may be used to determine where to erode cyan, magenta, and/or yellow separations to avoid color fringing at the edges of four color black (areas wherein process black is mixed with black ink). The present teachings find applicability in both single (i.e., fixed volume) drop per pixel ink deposition and multidrop per pixel (as well as variable volume drops) printing. The look-up table based edge finding and color modification is quick and can be implemented in hardware/software. Additionally, the teachings herein can operate in the drop count domain rather than continuous tone.

In accordance with one embodiment disclosed herein, there is taught a method of processing image data, comprising: receiving a plurality of pixels, each pixel having a plurality of separation values; analyzing the image data to identify pixels located at an edge; determining a coverage value from the separation values for the identified edge pixels; determining a reduction factor for the identified edge pixels based on the coverage value; and determining reduced separation values for the identified edge pixels based on the reduction factor.

In accordance with one embodiment disclosed herein, there is taught a system for reducing intercolor bleeding. The system includes an input data register receiving a plurality of pixels from the image data, each pixel having a plurality of separation values; a detection circuit analyzing the separation values of the plurality of pixels and generating a detection signal indicating whether an edge was detected; a summer receiving the separation values of the plurality of pixels from the input data register and compiling a coverage value from the received separation values; a lookup table generating a reduction factor based on the coverage value; a selector receiving the reduction factor and the detection signal, the selector generating a multiplier signal based on one of the reduction factor and a default value in response to the detection signal; and a reduction circuit generating reduced separation values for the plurality of pixels in response to the reduction signal.

BRIEF DESCRIPTION OF THE DRAWINGS

The embodiments and teachings disclosed herein will be described in detail, with reference to the figures, wherein.

DESCRIPTION

Figure 1:
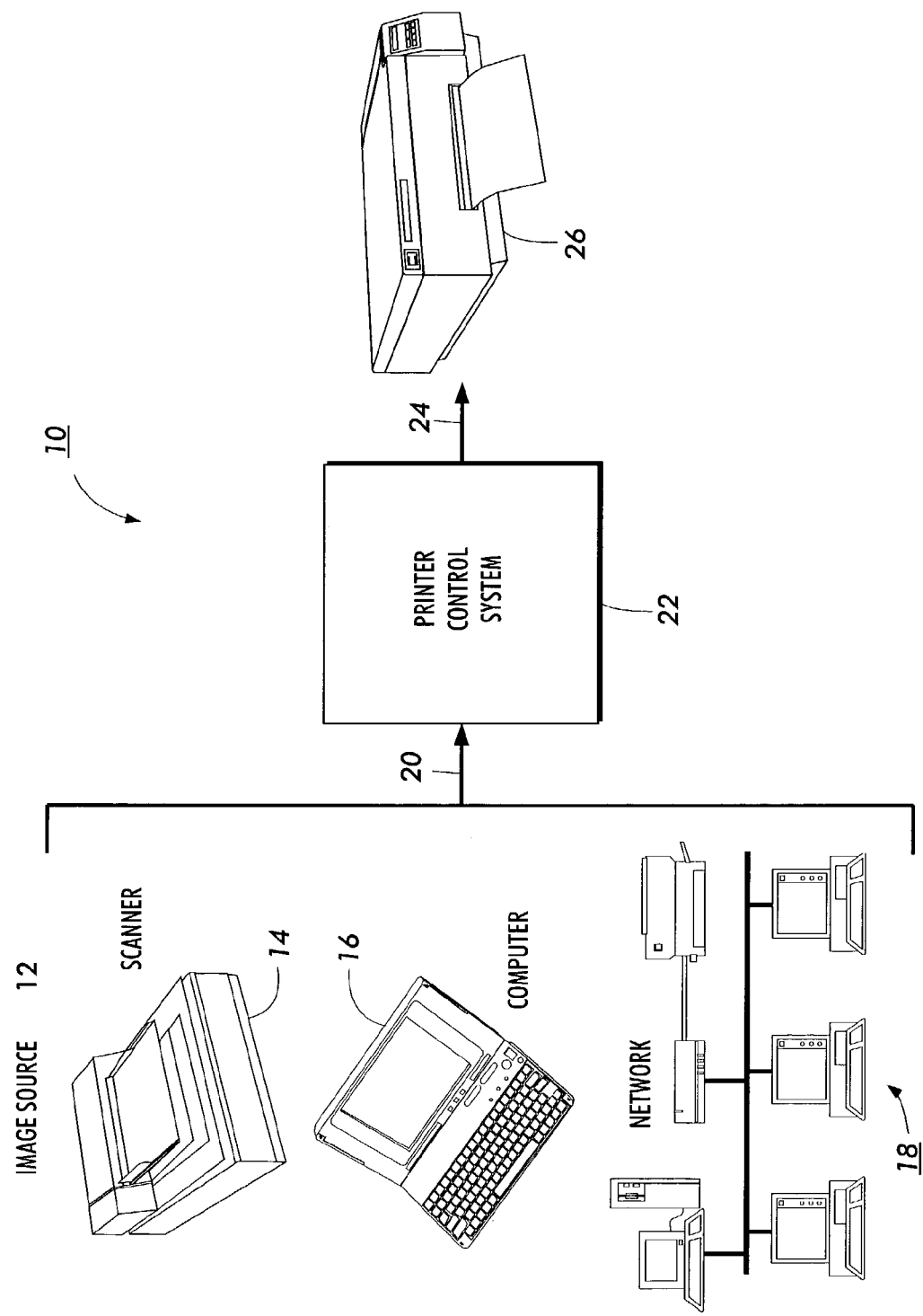
FIG. 1 is a general representation of a system-level embodiment which may incorporate one or more aspects of the embodiments disclosed herein.

For a general understanding of the present disclosure, reference is made to the drawings wherein like reference numerals have been used throughout to designate identical elements. The present description is directed in particular to elements forming part of, or cooperating more directly with an apparatus and a method for reducing intercolor bleeding in accordance with embodiments disclosed herein. It is to be understood that elements not specifically shown or described may take various forms well known to those skilled in the art.

Turning now to FIG. 1, there is shown an embodiment of an exemplary printing system 10 that incorporates the features disclosed herein. Printing system 10 includes image source 12 that may include scanner 14, computer 16, network 18 or any similar or equivalent image input terminal providing image data 20 which may be any combination of ASCII data, bitmapped image, pixel image data, geometric data, graphics primitives, page description language, etc. Image data 20 is supplied to printer control system 22 which processes the received image data 20 to produce print data 24 that drives printer 26.

In one embodiment, printer control system 22 may comprise what is commonly referred to in the art as a print driver. Printer control system 22 may also comprise a digital front end or similar controller driving printer 26. Those skilled in the art will recognize that control system 22 may be implemented in hardware and/or software and may reside within image source 12, within printer 26, within a separate component or in any combination thereof. In response to print data 24, which may comprise image data and/or printer control signals (e.g., paper handling, carriage control, ink deposition), printer 26 generates an output image on a suitable print medium. Beneficially, printer 26 may comprise a liquid ink printer.

The teachings of the present disclosure are generally directed towards aspects of printer control system 22 depicted in FIG. 1. In particular, there is disclosed a system and method for reducing inter-color bleeding that occurs at edges within an image. The embodiments disclosed herein are described as operating on color image data comprising two or more color planes or separations that are combined to form a composite image. Each separation comprises a raster image describing the image in terms of pixels arranged in scanlines. In other words, the image data includes a plurality of pixels, with each pixel having a plurality of separation values and with each separation value corresponding to the ink deposition for a given color component or color plane.

In the present description reference will be made to image data comprising four color planes, Cyan, Magenta, Yellow and blacK (CMYK); however, as should be appreciated, other combinations of separations and/or number of separations may be used. Thus, in describing the embodiments disclosed herein, each composite pixel comprises four associated separation pixels, one for each of the CMYK color planes. Each separation pixel beneficially comprises a pixel value (separation value) which may be considered as identifying drop counts, ink volume, or intensity.

Figure 2:
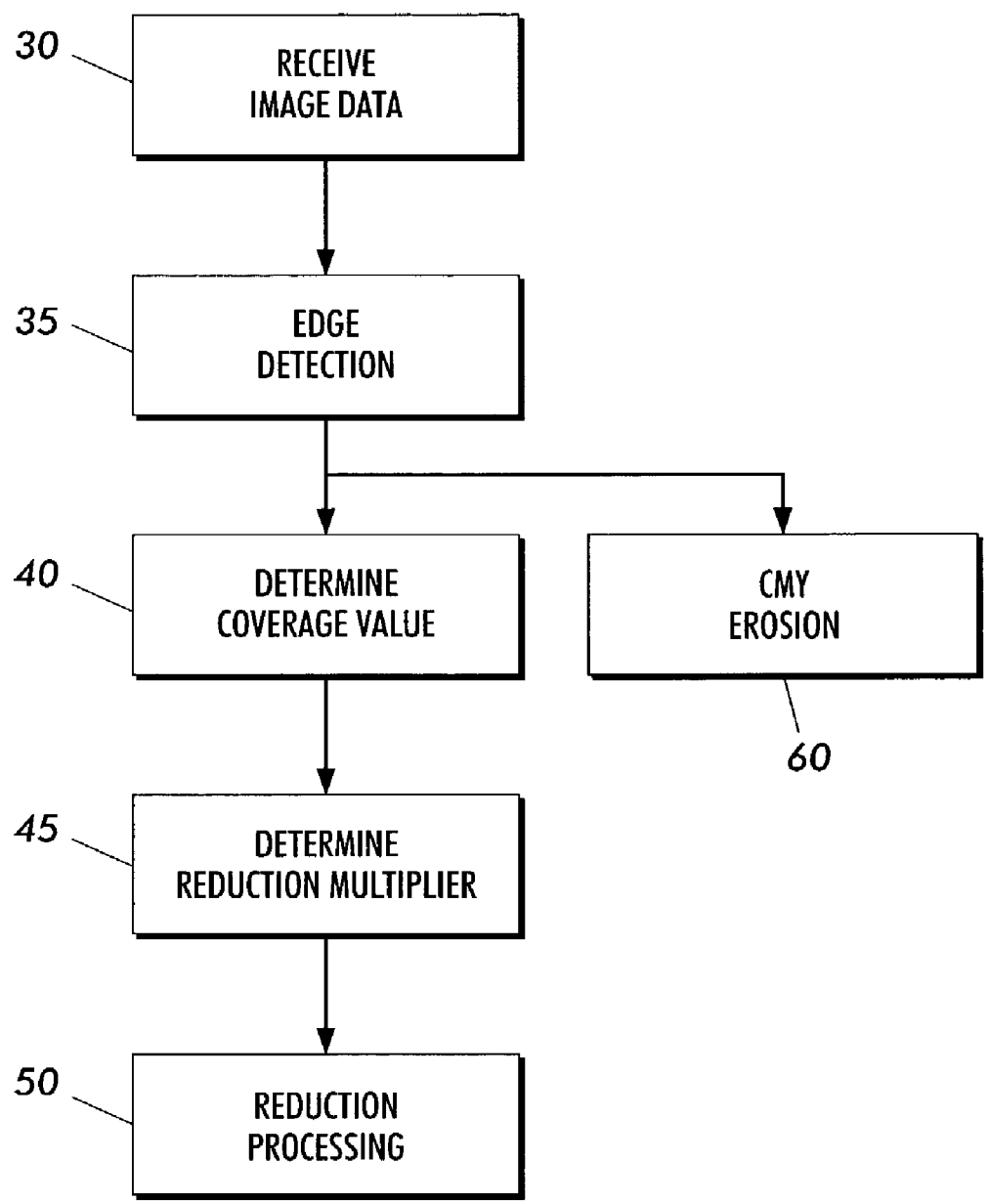
FIG. 2 illustrates a flow chart for an embodiment of a method for reducing intercolor bleeding.

Turning now to FIG. 2, there is shown a flow chart for an embodiment of a method for reducing intercolor bleeding. The method disclosed in FIG. 2 begins with the receipt of image data (block 30) which, as discussed above, may comprise one or more separations, with each separation comprising a plurality of pixels wherein each pixel identifies the number of drops of ink or the volume of ink to be deposited at a given location. Alternatively, the image data may comprise one or more separations, wherein each separation comprises a plurality of pixels with each pixel identifying the intensity at a given location (i.e., contone image data).

The image data is analyzed in an edge detection process (block 35) which may operate to detect edges at any one or more of four orientations, i.e., vertical, horizontal, and two diagonals. Any number of known techniques including, but not limited to, masking, look-up tables, edge detection filters, etc. may be used to identify an edge. A discussion of edge detection filters can be found in U.S. Pat. No. 5,635,967. In one embodiment, an edge is detected (determined to exist) if an edge is found in any separation. The method may require an "absolute edge," e.g., a pixel value requiring ink deposition adjacent a pixel with no ink deposited. Alternatively, the method may detect an edge at two adjacent separation pixels which both identify ink deposition by applying a simple function to the separation values of the adjacent pixels. This function may be a ratio, a difference, or some combination thereof. For example, the function could require that one pixel have at least two drops more than the other (or the sum of the image intensities exceeds a certain amount), and that one pixel have at least twice as many as the other. Such a function is given by:

$|P_1-P_2|\geq 2 \& ((P_1 \geq 2P_2) \text{ or } (P_2 \geq 2P_1))$ and may be conveniently loaded into a lookup table. It is to be appreciated that the above edge detection function is given by way of example and is but one of numerous functions which may be employed. Additionally, the edge detection operation may take into consideration more than just the two adjacent pixel values.

A coverage value is calculated from pixel values within the image data (block 40). In one embodiment, the total number of drops of ink, ink volume, or image intensity (depending upon the pixel data) in all separations at each pixel is summed, giving the coverage value. Alternatively, the process may weight pixel values in one or more of the separations differently than those in other separations.

The coverage values for two adjacent pixels are used to determine a reduction factor (block 45). The coverage values may be used to compute a function giving the reduction factor. For example, Here again, this function may be readily implemented as a lookup table. Optionally, the reduction factor may be a function of the coverage value and the pixel value for a given separation. As should be appreciated, the reduction applied to each separation need not be the same. That is, a different reduction factor may be applied to one or more separations. For example, a first reduction factor based on the first coverage value and a second reduction factor based on the second coverage value are determined so that a first separation value of a first edge pixel is multiplied by the first separation reduction factor and a second separation value of a first edge pixel is multiplied by the second separation reduction factor. Beneficially, the reduction factor is a multiplier applied to the pixel value in each separation. A reduction factor of one would indicate no reduction, while a reduction of zero would indicate total reduction. The function would typically yield a reduction factor close to 1 when the coverage value for either pixel location is very small. Similarly, the function might yield a small reduction factor when the coverage values for both pixels are large. Moreover, the function might generate a first reduction factor when the first coverage value is greater than the second coverage value and generate a second reduction factor when the second coverage value is greater than the first coverage value. It is to be appreciated that a different reduction factor multiplier could be used at each of the two pixels.

Where an edge is present (e.g., detected at block 35) the reduction multipliers are employed in a reduction process to yield processed image data corresponding to reduced drop counts (reduced ink volume) at the edges that would otherwise be likely to experience intercolor bleeding (block 50). In one embodiment, the pixel values (e.g., drop counts, ink volumes, intensity) in all separations of the respective pixels are multiplied by the reduction multipliers. Optionally, the process may multiply every set of pixels by a reduction multiplier, wherein the reduction multiplier is set to 1 for those pixels where an edge has been not detected.

Optionally, the detection of an edge in the black separation at block 35 may be employed to determine where to erode the cyan, magenta and yellow separations (block 60) to avoid color fringing at the edges of four color black, i.e., regions comprising black ink with process black. Briefly, process black (i.e., CMY black) may be added to areas of black pixels in order to maximize the optical density in such solid black areas, particularly for small drop sizes.

Edges in different directions might preferably receive different amounts of etching due to color alignments and/or surface tension or mixing effects as caused by the time and order between printing. Thus, by operating the detection process employed in the black separation to identify whether the edge is a rising or falling edge, the detection signal may be employed to determine how much to erode the cyan, magenta and yellow separations. That is, if a falling edge is detected in the black separation the detection may be employed to determine one amount to reduce C, M, and Y whereas if a rising edge is detected a different amount of reduction is desired. A detection function to discriminate between rising and falling edges may be readily implemented. For example $|P_1-P_2|\geq 2 \& (P_1 \geq 2P_2)$ may be used to detect rising edges and $|P_1-P_2|\geq 2 \& (P_2 \geq 2P_1)$ may be used to detect falling edges. Similar considerations would also apply to vertical and horizontal edges. In addition, neighboring blocks of colors might also require direction dependent ink reductions to optimally reduce intercolor bleeding.

Figure 3:
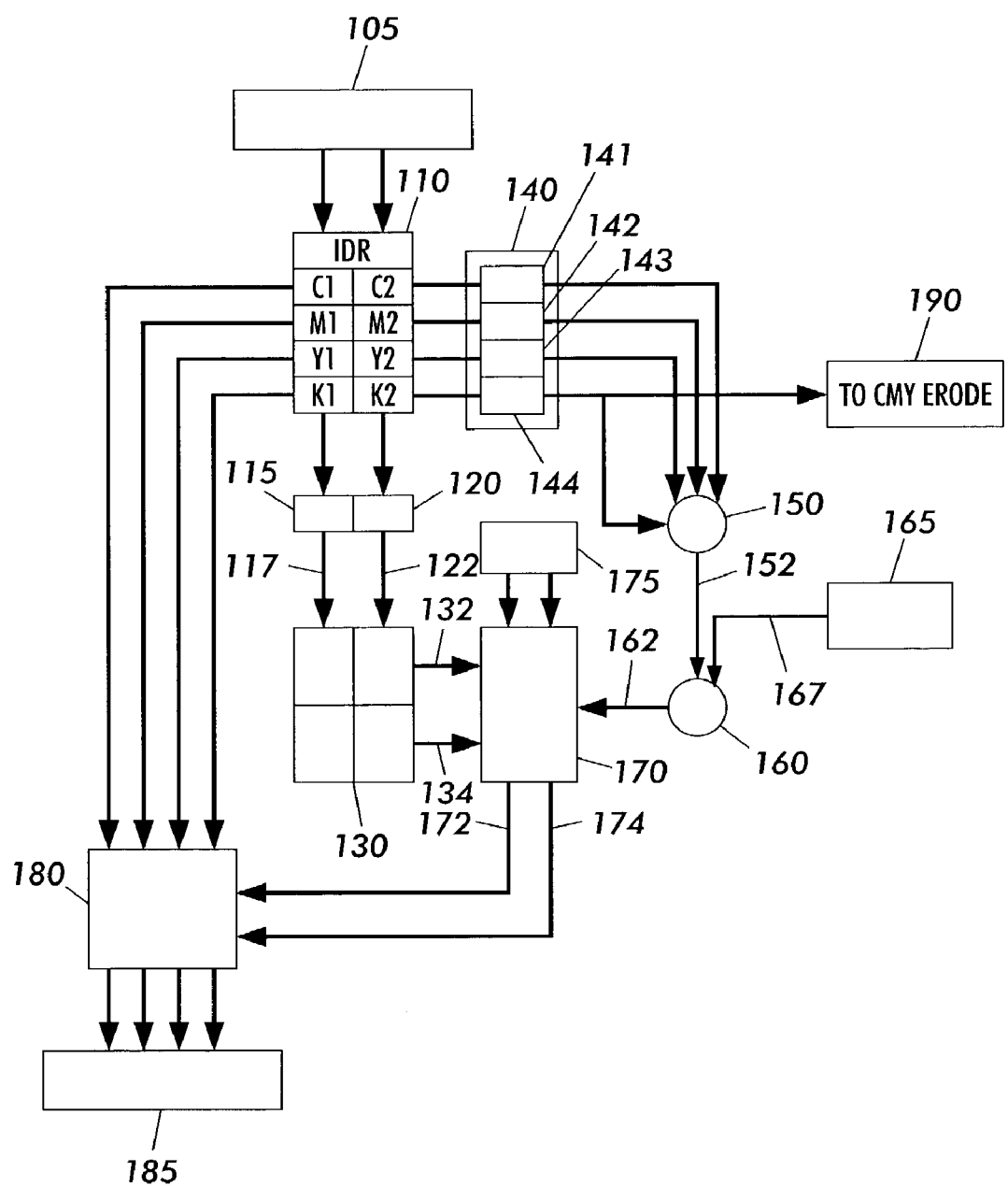
FIG. 3 is a schematic diagram of one system for reducing intercolor bleeding.

Turning now to FIG. 3, there is shown a schematic diagram of system 100 for reducing intercolor bleeding. In FIG. 3 image data held in memory or buffer 105 is supplied to input data register IDR 110. As shown in FIG. 3, IDR 110 receives two pixels of image data $P_1$ ($C_1M_1Y_1K_1$) and $P_2$ ($C_2M_2Y_2K_2$). From IDR 110, each of the two pixels is supplied to a summer 115, 120; while pairs of separation pixels for each of the four separations are supplied to edge detection circuit 140.

More particularly, each input pixel is supplied to a summer 115, 120. That is, one pixel ($C_1M_1Y_1K_1$) is supplied to summer 115 and one pixel ($C_2M_2Y_2K_2$) is supplied to summer 120. Summers 115, 120 each compute a coverage value 117, 122 identifying the total ink deposition at each pixel by totaling the separation values (number of drops, image intensity, ink volume, etc.) of all separations at the corresponding pixel giving a coverage value. As should be appreciated, the summers may operate to weight different separations unequally.

The coverage values 117, 122 generated at summers 115, 120 are passed to lookup Table (LUT) 130 which in turn provides reduction multipliers to selector 170. As illustrated in the embodiment of FIG. 3, LUT 130 supplies a pair of reduction multipliers 132, 134 in response to the coverage values. More specifically, the coverage values 117, 122 operate as addresses (indices) into LUT 130 to provide the pair of multipliers 132, 134. The use of two multipliers provides the ability to customize the ink reduction for the pixels at each side of the edge.

As indicated above, each pair of separation pixels received at IDR 110 is supplied to edge detection circuit 140. Edge detection circuit 140 is shown as comprising four individual edge detectors (141–144) each of which operates to detect edges within a given separation. That is, in the present embodiment, separation pixel pair $C_1$, $C_2$ is supplied to detector 141 which operates to detect edges in the cyan separation, pair $M_1$, $M_2$ is supplied to detector 142, pair $Y_1$, $Y_2$ is supplied to detector 143 and pair $K_1$, $K_2$ is supplied to detector 144.

Each detector 141–144 may embody a look up table, filter or similar processor to detect an edge at the adjacent separation pixels. As discussed above, the detector may apply a function to the values of the adjacent pixels to detect the edges. As should be appreciated, different detection rules (detection functions) may be applied to one or more of the separations. Each detector supplies a detection signal identifying whether an edge has been detected. The detection signals are combined at circuit 150 to generate aggregate edge signal 152. Optionally, the detection signal generated by detector 144 operating to find edges in the black separation may be supplied to CMY erosion processor 190 in conjunction with a CMY offset operation.

Circuit 150 may employ a logical OR operation if the detection signals are binary or a MAX operation if the detection signals are multibit signals. Aggregate signal 152 provides an indication if an edge is present. For example, the signal may be a logical 1 (true) if an edge exists and a logical 0 if an edge is not detected. Aggregate detection signal 152 may be combined at combination circuit 160 with an optional drop count threshold signal 167 supplied from threshold circuit 165.

Thresholder 165 operates to determine a drop count in the area of the edge and provide a signal which will override the detection signal to prevent possible pixel deletion. More particularly, drop count thresholder 165 counts the drops to be deposited, determines if pixel deletion may occur as a result of a subsequent bleed reduction processing and provides the appropriate threshold signal 167 to combination circuit 160.

It should be appreciated that horizontal and vertical pairs of pixels must be treated independently. In other words, a pixel falling within both a detected horizontal and vertical edge would be processed independently with the resulting processed image data having the minimum drop count beneficially being used in generating the image. For example, when a vertical edge is identified between a first pixel and a second pixel and a horizontal edge is identified between the first pixel and a third pixel, a first reduction factor for the first pixel is determined based on coverage values for the first pixel and the second pixel and a second reduction factor for the first pixel is determined based on coverage values for the first pixel and the third pixel. In this example, the separation values of the first pixel is multiplied by the first reduction factor when the second reduction factor is greater than the first reduction factor.

Reduction circuit 180 applies the multiplier signals 172, 174 to the separation values for the pixels at the detected edge. In particular, selector receives the image data $P_1$ and $P_2$ from IDR 110, and multiplies the separation values for each pixel by the corresponding multiplier, e.g., ($C_1M_1Y_1K_1$) by multiplier 172 and ($C_2M_2Y_2K_2$) by multiplier 174. The resulting reduced pixels values are provided to update processed image data 185.

In summary, image data is received through input data register IDR 110 and passed through summers 110, 115 and edge detectors 141–144. Detectors 141–144 produce detection signals identifying whether an edge exists in the corresponding separation. The edge detection signals are combined at circuit 150 providing an aggregate edge detection signal 152 which may further be combined at circuit 160 with a signal generated by an optional drop count thresholder 165. The resulting edge detection signal controls selector 170 which selects between multiplying the separations by a default value (beneficially 1) stored in memory 175 or by the reduction multiplier supplied by LUT 125 in response to the coverage values computed as summers S 115, 120.

It should be appreciated that horizontal and vertical pairs of pixels must be treated independently. In other words, a pixel falling within both a detected horizontal and vertical edge would be processed independently with the resulting processed image data having the minimum drop count beneficially being used in generating the image.

As previously described, the detection process may operate to detect edges at any one or more of four orientations, i.e., vertical, horizontal, and two diagonals by comparing (applying a function to) the values of two or more adjacent pixels. However, it should be appreciated that diagonal edges can be found (i.e., detected) by noting that any pixel which is at both a vertical and a horizontal edge will be on a diagonal edge as well as be diagonally adjacent to a pixel which is at an edge but not identified by either a vertical or horizontal detection process. Moreover, all pixels on diagonal edges fall into this class. This concept is illustrated in FIG. 4 in more detail.

Figure 4:
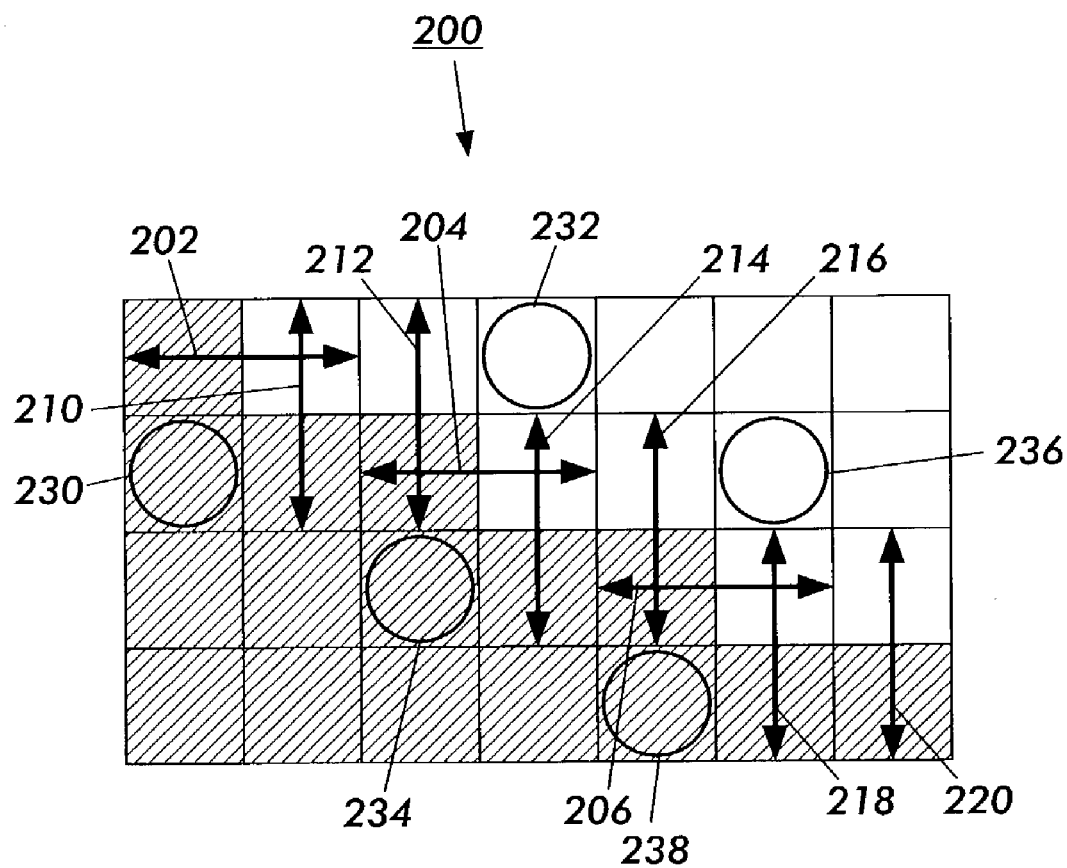
FIG. 4 shows a sample image illustrating horizontal, vertical, and diagonal edges.

Referring to FIG. 4, there is shown a sample image portion 200 having a plurality of ON pixels and OFF pixels. In FIG. 4, vertical edges, detected by checking horizontal neighbors, are identified by horizontal arrows 202, 204, 206. Horizontal edges detected by checking vertical neighbors are identified by arrows 210, 212, 214, 216, 218, 220. Pixels that are adjacent to diagonal edges, but are not flagged by vertical or horizontal processing (undetected diagonal edges) are identified by reference numbers 230, 232, 234, 236, and 238. Note that pixels that are flagged as being both in a vertical and horizontal edge can be considered to be detected diagonal edges as well. As can be seen the undetected diagonal edges are surrounded by a fixed pattern of edges. In particular, the undetected diagonal edges are inside the angle formed by the arrows. For example, one set of undetected diagonal edges is found as those pixels that are down and to the left of the pixels which are identified as edges as being both up and to the right of contrasting pixels. Similar sets of rules can be defined for finding the other three cases.

The diagonal edge pixels flagged by both vertical and horizontal detection processes should be processed in the same manner as those "undetected diagonal edge pixels" not flagged by either detection process but recognized in a manner as described above. The reduction process will be similar to the reduction processing a horizontal or vertical edge; however, it should be appreciated that any weighting factors applied when summing separation values to determine coverage values and the reduction multipliers employed may differ as the distance from the pixel center to the edge is not the same as that for horizontal or vertical edges.

It is to be appreciated that in order to find horizontal edges (transition between vertical neighbors), as well as diagonal edges, a scanline of buffer is required. Assuming the buffer refers to the prior scanline, then for each cycle one pixel of the prior scanline is completely processed, and one pixel of the prior scanline is partially processed. Two pixels of the current scanline are partially processed (that is, reduction processing results can overwrite a pixel in the prior scanline). One possible implementation finds an edge with respect to the pixels to the left, above and both upward diagonals (possibly using the simplification described with reference to FIG. 4). In this case the pixels above and to the left, and up-right would be changed but not output for further processing or printing (rather only being saved to a buffer), while the up-left pixel would be completely modified on this cycle.

A brief review of system resource requirements for one embodiment of a system in accordance with FIG. 3 may be useful in determining whether one may implement such a system in hardware, software or a combination thereof. In addition to the buffer of one scanline of pixel data (at 16 bits per pixel, four bits per separation value), the embodiments described above include various lookup tables. The number of tables would depend on the flexibility and parallelism required. Edge detector 140 is shown as having four look up tables 141–144. In one embodiment, such replication requires 1024 bits, or 64 bytes. Each summer 115, 120, if it weights the different separations differently, might require 4 bits of address to a TRC (tone reproduction curve) per separation, which could implement a multiplication table for each separation. The output from the table would be at least 4, possibly as much as 8 bits, in which case the total memory for 8 TRCs (four separations, replicated for fast access), would be 8×16=128 bytes. If the sum is weighted, the result could be passed through a compressive TRC, producing a five bit number, without loss of information (256×5 bits times two identical tables, assumed stored as 512 bytes). If the sum is not weighted, it will always fit in five bits. In this case LUT 130 which contains reduction multipliers would require 1024 entries, each of which is a pair of multipliers. Assuming four bits provides sufficient precision for the multipliers, a total of 1024 bytes would be required. Finally there is the final multiply (reduction circuit 180), which should ensure that anything multiplied by the internal representation of 1 yields the initial result. This can be assumed to be a 4 bit by 4 bit pseudo-fixed point multiply, producing a 4 bit result, which is conveniently stored in a 256-entry lookup table of 4 bit entries, or 128 bytes. Again for speed this table could be eight-fold replicated, for 2048 bytes. In all, the memory requirements could be kept to under 4 Kbytes (the scanline buffer, plus 2048+1024+512+128+64 bytes as described above). As should be appreciated the total resource requirements can be increased or decreased by design choices. For example, with somewhat less flexibility, a non-weighted sum and logic based multiply would reduce the memory requirements.

In summary, there has been disclosed embodiments for detecting edge locations where intercolor bleed would likely be a problem, and reducing the amount of ink printed at those locations. One embodiment of a method operates on multiple-drop per pixel input, producing a multiple drop per pixel output at full resolution. The disclosed embodiments employ simple logic and rely on look-up tables for flexibility. Small look-up tables are employed to find edges within separations and to determine an amount to reduce ink on both sides of the edge. The tables allow the process to be optimized or readily changed to alter the definition of what is an edge, and how much to reduce the ink based on the two colors on either side based on type of ink (change in ink), or as a function of paper type. The look-up table based edge finding and color modification is quick and can be implemented in hardware/software.

A system or method could be further augmented by tags indicating that the image being processed has no need of such change, or it could run in the absence of tags. Possible sources of such tags include drop counting circuitry used to determine drying needs, and the DFE, providing object tags.

A further benefit of the embodiments is generation of a signal which may be used to determine where to erode cyan, magenta, and/or yellow separations to avoid color fringing at the edges of four color black (areas wherein process black is mixed with black ink).

While particular embodiments have been described, alternatives, modifications, variations, improvements, and substantial equivalents that are or may be presently unforeseen may arise to applicants or others skilled in the art. Accordingly, the appended claims as filed and as they may be amended are intended to embrace all such alternatives, modifications variations, improvements, and substantial equivalents.

The invention claimed is:

1. A method of processing image data, comprising:
   receiving a plurality of pixels, each pixel having a plurality of separation values;
   analyzing the image data to identify first and second edge pixels located at an edge;
   determining first and second coverage values from the separation values for the identified edge pixels by adding the separation values of the first edge pixel to obtain the first coverage value and adding the separation values of the second edge pixel to obtain the second coverage value;
   determining a first reduction factor based on the first coverage value, the first reduction factor includes a first separation reduction factor and a second separation reduction factor;
   determining a second reduction factor based on the second coverage value;
   multiplying each of the separation values of the second edge pixel by the second reduction factor;
   multiplying a first separation value of the first edge pixel by the first separation reduction factor; and
   multiplying a second separation value of the first edge pixel by the second separation reduction factor.

2. The method of claim 1, wherein each one of the separation values of a pixel corresponds to a unique color plane and wherein the step of analyzing the image data comprises comparing a first separation value of a first pixel with a second separation value of a second pixel adjacent to the first pixel, wherein the first and second separation values correspond to the same color plane.

3. The method of claim 2, wherein the step of comparing a first separation value comprises applying a function to the first and second separation values.

4. The method of claim 1, wherein the step of adding the separation values of the first edge pixel further comprises multiplying a first separation value by a first weighting factor.

5. The method of claim 1, wherein a first separation value of the first edge pixel identifies number of drops.

6. The method of claim 1, wherein a first separation value of the first edge pixel identifies intensity.

7. The method of claim 1, wherein the step of analyzing the image data comprises:
   comparing sets of horizontally adjacent pixels to identify pixels located at vertical edges; and
   comparing sets of vertically adjacent pixels to identify pixels located at horizontal edges.

8. The method of claim 7, further comprising identifying pixels located at diagonal edges from the identified pixels located at vertical edges and the identified pixels located at horizontal edges.

9. A method of processing image data, comprising:
   receiving a plurality of pixels, each pixel having a plurality of separation values;
   analyzing the image data to identify first and second edge pixels;
   determining a first coverage value by adding the separation values of the first edge pixel for the first edge pixel;
   determining a second coverage value by adding the separation values of the second edge pixel for the second edge pixel;
   determining a first reduction factor when the first coverage value is greater than the second coverage value and a second reduction factor when the second coverage value is greater than the first coverage value; and
   determining reduced separation values for the first and second edge pixels based on the reduction factor.

* * * * *